US012523893B2

(12) United States Patent
Piliarik et al.

(10) Patent No.: US 12,523,893 B2
(45) Date of Patent: Jan. 13, 2026

(54) THERMO-OPTICAL SPATIAL LIGHT MODULATOR

(71) Applicant: USTAV FOTONIKY A ELEKTRONIKY AV CR, V. V. I., Prague (CZ)

(72) Inventors: Marek Piliarik, Libeznice (CZ); Hadrien Marc Louis Robert, Prague (CZ)

(73) Assignee: USTAV FOTONIKY A ELEKTRONIKY AV CR, V. V. I., Prague (CZ)

( * ) Notice: Subject to any disclaimer, the term of this patent is extended or adjusted under 35 U.S.C. 154(b) by 284 days.

(21) Appl. No.: 17/767,393

(22) PCT Filed: Oct. 2, 2020

(86) PCT No.: PCT/CZ2020/050072
§ 371 (c)(1),
(2) Date: Apr. 7, 2022

(87) PCT Pub. No.: WO2021/068995
PCT Pub. Date: Apr. 15, 2021

(65) Prior Publication Data
US 2024/0077757 A1  Mar. 7, 2024

(30) Foreign Application Priority Data
Oct. 11, 2019 (CZ) .................. CZ2019-637

(51) Int. Cl.
*G02F 1/01* (2006.01)
*G02F 1/29* (2006.01)

(52) U.S. Cl.
CPC .......... *G02F 1/0147* (2013.01); *G02F 1/0126* (2013.01); *G02F 1/292* (2013.01)

(58) Field of Classification Search
CPC ........ G02F 1/073; G02F 1/129; G02F 1/0131; G02F 1/1026; G02F 1/01; G02F 1/0147
See application file for complete search history.

(56) References Cited

U.S. PATENT DOCUMENTS 4,497,544 A  2/1985  Mitchell et al.
5,796,107 A  8/1998  Buchtemann et al.
(Continued)

FOREIGN PATENT DOCUMENTS

EP  3299872 A1 *  3/2018  ........... G02F 1/0121
EP  3410184 A1  12/2018

OTHER PUBLICATIONS

Guillaume Baffou et al., "Thermal Imaging of Nanostructures by Quantitative Optical Phase Analysis", ACS Nano, vol. 6, No. 3, Mar. 27, 2012 (Mar. 27, 2012), pp. 2452-2458, XP055627670, ISSN: 1936-0851, DOI: 10.1021/nn2047586, http://dx.doi.org/10.1021/nn2047586, retrieved Apr. 7, 2022.
(Continued)

*Primary Examiner* — Sharrief I Broome
*Assistant Examiner* — Journey F Sumlar
(74) *Attorney, Agent, or Firm* — Notaro, Michalos & Zaccaria P.C.

(57) ABSTRACT

A spatial light modulator having a layer of thermo-optical medium, where the thermo-optical medium is at least partially transparent for at least one spectral component of visible or near infrared light and having the thermal conductivity between 0.01 and 30 W K−1 m−1 at the temperature of 20° C. and the layer having a thickness up to 100 μm is disclosed. At least one heating microsource in thermal contact with the layer of the thermo-optical medium, where each heating microsource has at least one dimension smaller than 10 μm, and at least one substrate in thermal contact with the thermo-optical medium, the substrate having a thermo-optic coefficient at least 10 times smaller than a thermo-optic
(Continued)

coefficient of the thermo-optical medium and a thermal conductivity of at least 1 W K−1 m−1 while the thermal conductivity of the substrate is higher than the thermal conductivity of the thermo-optical medium.

13 Claims, 9 Drawing Sheets

(56) References Cited

U.S. PATENT DOCUMENTS

| | | |
|---|---|---|
| 6,311,004 B1 | 10/2001 | Kenney et al. |
| 9,804,424 B2 | 10/2017 | Donner et al. |
| 2005/0248844 A1 | 11/2005 | Ueno et al. |
| 2012/0263793 A1* | 10/2012 | Vitaliano ............. G01N 21/648 424/490 |
| 2015/0150993 A1* | 6/2015 | Kaplan .................. A61L 27/28 424/130.1 |

OTHER PUBLICATIONS

Tamaki E et al: "Microchannel-assisted thermal-lens spectrometry for microchip analysis", Journal of Chromatography A, Elsevier, Amsterdam, NL, vol. 987, No. 1-2, Feb. 14, 2003 (Feb. 14, 2003), pp. 197-204, XP004405820, ISSN: 0021-9673, DOI:10.1016/S0021-9673(02)01661-8, http://dx.doi.org/10.1016/S0021-9673(02)01661-8, retrieved Apr. 7, 2022.

International Search Report and Written Opinion for corresponding PCT application No. PCT/CZ2020/050072, mailed Dec. 17, 2020.

* cited by examiner

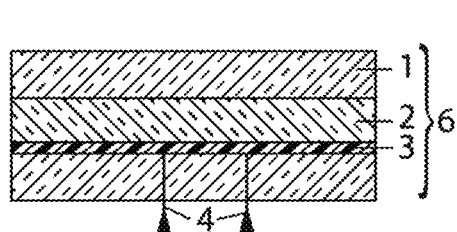
Figure 1.a
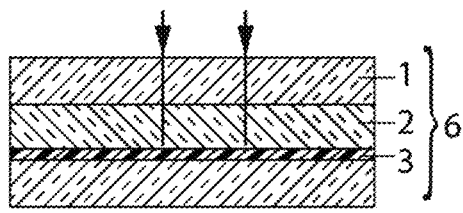
Figure 1.b
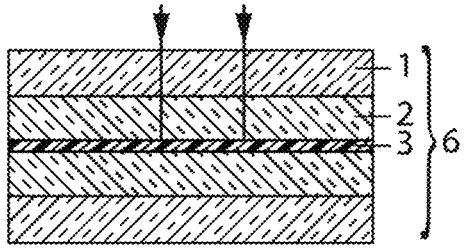
Figure 1.c
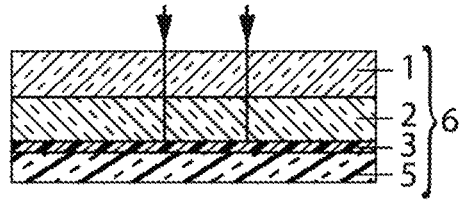
Figure 1.d
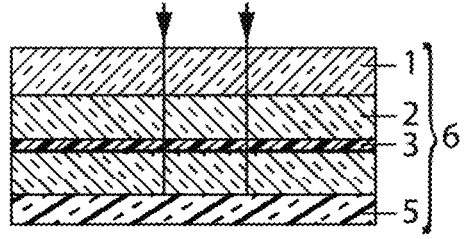
Figure 1.e
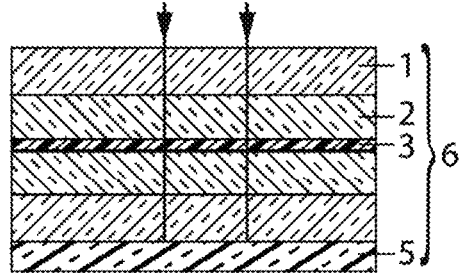
Figure 1.f
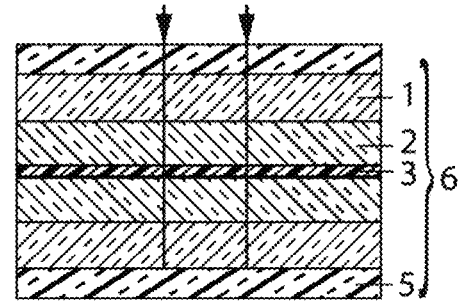
Figure 1.g
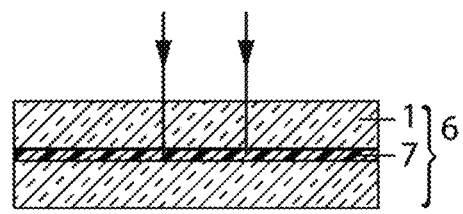
Figure 1.h
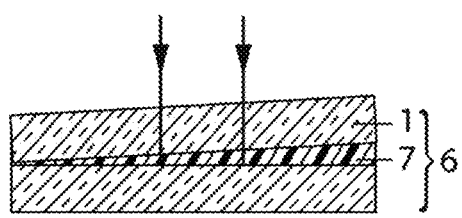
Figure 1.i

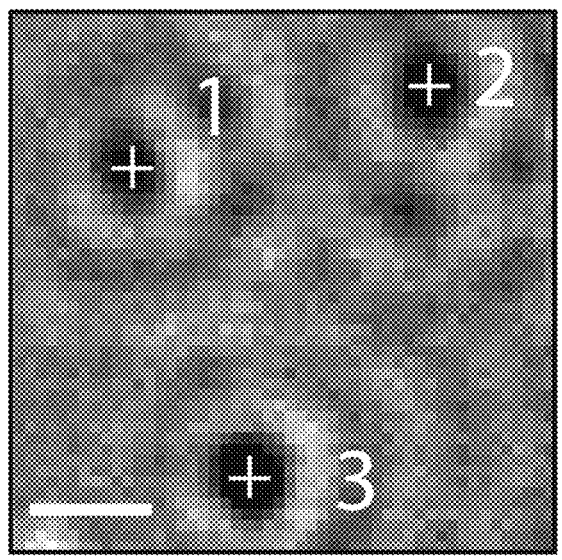 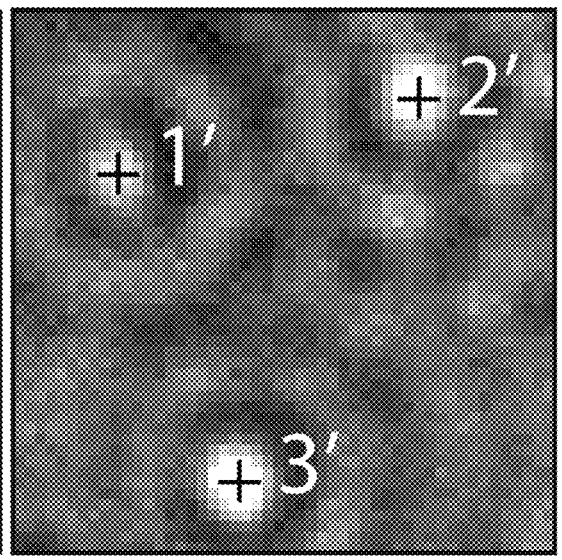
Figure 11a          Figure 11b
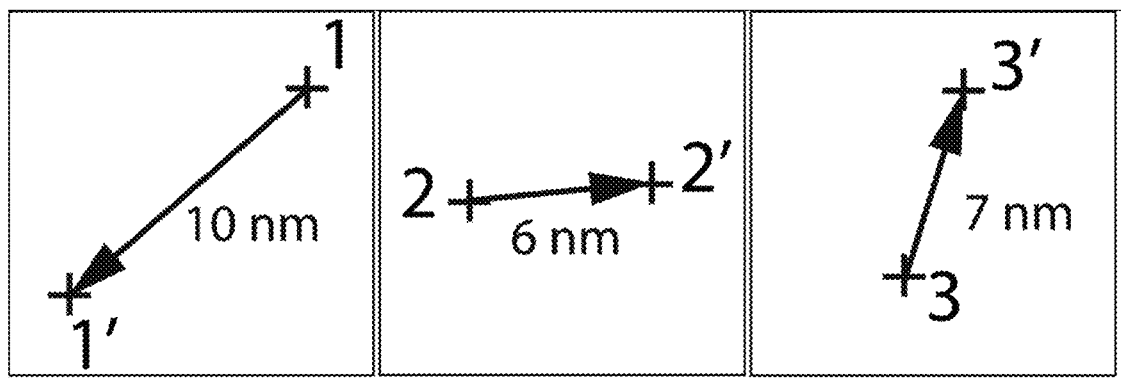
Figure 12a          Figure 12b          Figure 12c

THERMO-OPTICAL SPATIAL LIGHT MODULATOR

FIELD

The present invention relates to a spatial light modulator, and an interferometric imaging system containing such spatial light modulator.

BACKGROUND ART

Spatial light modulators (SLM) are active optical components imposing a spatially varying modulation of a particular light property such as intensity, phase or polarization to the wavefront of an optical beam. SLM enabled important improvements in astronomy and microscopy and became essential to perform efficient active phase shaping. The most important applications of SLM include beam shaping, used in super-resolution imaging and digital holography techniques, and adaptive optics, allowing for beam shape corrections in imaging through inhomogeneous material such as atmosphere in astronomy or diffusive tissues in biology. Modern SLM rely on an array of micro-pixels electronically addressable to spatially pattern the wavefront of incoming light. There are two major technology approaches to create a locally confined spatial light modulation based either on a micromirror pixel with adjustable positions or a liquid crystal pixel of adjustable birefringence. The major limitation of different approaches include slow response time, dispersion effects, diffraction effects, anisotropic effect for liquid crystals and diffraction effects, lack of continuous adjustment for digital micromirror devices.

Thermo-optic effect is the method of choice for phase-shift control in waveguide optics due to a strong confinement of the optical field described for example in U.S. Pat. No. 6,311,004. However, in a free space imaging configuration, the thermo-optic effect is associated with a number of side effects and aberrations. Indeed, heat can induce mechanical drift or lens dilation, and macroscopic heating is intrinsically slow. On microscopic scale, the temporal response of local heating is quadratic dependent on the characteristic dimension and at scales below ~10 μm it is possible to enter the sub millisecond regime. In one example when metal nanoparticles are illuminated at their plasmon resonance, a part of the incident light is absorbed which makes them efficient heat nanosources, this effect is called thermoplasmonic effect. However, a local heat source generates by definition a gradient temperature profile in the vicinity of the heat source which can be used to provide a phase sensing information e.g. for thermal imaging (ACS nano, 6(3), 2452-2458) or used as a focusing device in a photothermal lens with variable magnification (ACS Photonics, vol. 2, pp. 355-360 and U.S. Pat. No. 9,804,424). The temperature gradient generated in the semi-infinite liquid medium induces a 3-dimensional gradient in the refractive index of the medium resulting in the gradient lens effect. It has been shown that the focal length of the lens can be tuned from few μm with time-responses as short as 200 μs. Taking advantage of the native gradient induced by the thermal flow to create a component of specific optical properties was a simple workaround for a very specific task of wavefront shaping.

Creating a uniform temperature profile within a local spatial boundary remained the major challenge in developing a thermo-optical spatial light modulator for a free-space light beam.

SUMMARY OF THE INVENTION

Object of the present invention is a new type of spatial light modulator using thermo-optic effect to generate areas of local semi-uniform variation in refractive index, which is not sensitive to polarization, is free of residual diffraction patterns and can reach the frequencies of modulation in the MHz range with the full range of phase-shift.

In a first aspect of the present invention, a spatial light modulator is provided, said spatial light modulator comprising:
- a layer of thermo-optical medium, wherein the thermo-optical medium is at least partially transparent for at least one spectral component of visible or near infrared light and having the thermal conductivity between 0.01 and 30 $W K^{-1} m^{-1}$, said layer having a thickness up to 100 μm,
- at least one heating microsource in thermal contact with the layer of the thermo-optical medium, wherein each heating microsource has at least one dimension smaller than 10 μm;
- at least one substrate in thermal contact with the thermo-optical medium, said substrate having a thermo-optic coefficient at least 10 times smaller than a thermo-optic coefficient of the thermo-optical medium and a thermal conductivity of at least 1 $W K^{-1} m^{-1}$ while the thermal conductivity of the substrate is higher than the thermal conductivity of the thermo-optical medium.

The term "spectral component of light" shall be understood as a specific wavelength or a continuous range of wavelengths of light.

The term "at least partially transparent" shall be understood as meaning a medium with at least a partial transmissivity for the relevant spectral component, preferably with at least 50% transmissivity for the relevant spectral component.

The ultraviolet light is light with wavelength within the range of from 10 to 380 nm.

The visible light is light with wavelength within the range of from 380 to 800 nm.

The near infrared light is light with wavelength within the range of from 800 to 2500 nm.

The infrared light is light with wavelength within the range of from 2.5 μm to 1000 μm.

The term "thermo-optic coefficient" is the first order of the Taylor series of the refractive index sensitivity to the temperature.

The term "in thermal contact" shall be understood as meaning that a temperature change induced in an object A said to be in thermal contact with another object B results in a proportional temperature change in at least part of the volume of the object B, preferably that the object A has at least one common surface with the object B.

The term "modulating beam" refers to a beam of light used to heat the heating microsources by light absorption. Preferably the modulation beam has a homogeneous intensity profile or an intensity profile following a Bessel function in particular the 2D Fourier transformation of a disc.

The term "probe beam" refers to a beam of light to be modulated by the spatial light modulator. Preferably the probe beam is emitted from at least one light source with homogeneous wavefront or the probe beam is part of a light wave reflected on an object or the probe beam is part of a light wave scattered on an object or the probe beam is a combination of the said options.

The term "nanostructured layer" means a nanoscale or a microscale layer produced in a controlled manner, for example coating, deposition.

The term "nanopatterned layer" means a nanoscale or a microscale layer with a defined regular repetitive pattern.

Generally, values of all temperature-dependent characteristics specifically listed herein are as measured at 20° C.

The thickness of the layer of the thermo-optical medium is up to 100 μm. Preferably, it is up to 20 μm, more preferably within the range of 1 to 100 μm or 1 to 20 μm. The layer of the thermo-optical medium may have a uniform (homogeneous) thickness, or a non-uniform (heterogeneous) thickness), e.g., the thickness may form a gradient.

Preferably, the thermo-optical medium has a magnitude of the thermo-optic coefficient |dn/dT| equal to or higher than $8 \times 10^{-5}$ $K^{-1}$ at 20° C. and for wavelength ranging from visible to infra-red light, i.e., higher or equal than water thermo-optic coefficient.

In some embodiments, the thermo-optical medium is selected from oil, water, alcohol (e.g. glycerol, octanol, dodecanol, ethylene glycol, diethylene glycol, polyvinyl alcohol (PVA)), polydimethylsiloxane (PDMS), SF type glass, sapphire, epoxy, poly(methyl methacrylate) (PMMA), polyvinyl chloride (PVC), poly(ethyl methacrylate) (PEMA), tert-butyl poly(ether-etherketone), polystyrene, silicone, polycarbonate and urethane acrylate elastomer.

The thermo-optical medium may in some embodiments be in the form of a liquid, a gel or sol-gel.

The heating delivered by the heating microsources may be caused, for example:
- by irradiation by a modulating beam having the plasmon frequency of the heating microsources (in particular nanoparticle photothermal elements);
- by irradiation by a modulating beam absorption of the heating microsources (in particular layer of photothermal element(s));
- by Joule effect or induction heating generated by the current in an electrically conducting circuit of the heating microsources (in particular electrothermal elements).

In some embodiments, the heating microsources may be photothermal elements which are in thermal contact with the layer of the thermo-optical medium, said photothermal elements having at least one dimension smaller than 10 μm and at least partly absorbing at least one spectral component of ultraviolet, visible, near infrared or infrared light.

The photothermal elements are typically made of metals (e.g., gold, silver, aluminium), metal nitrides (e.g., titanium nitride, zirconium nitride, tantalum nitride), metallic oxides (e.g. indium tin oxide, ITO), carbon.

The photothermal elements may be located on the interface of the substrate and the thermo-optical medium and/or dispersed in the thermo-optical medium and/or located in a specific region of the thermo-optical medium. The dispersion is suitable in particular for nanoparticles as photothermal elements, especially for nanoparticles having the size smaller than the central wavelength of a probe beam.

In some embodiments, the photothermal elements may be shaped substantially as spheres, hemispheres, rods, cubes, stars, pillars, disks, or a mixture of such elements. In case of dispersed elements, also colloidal particles may be used. The photothermal elements typically have nano-dimensions (are nanoparticles), i.e., the largest dimension is up to 1 μm, preferably smaller than 100 nm. It is advantageous when the nanoparticle photothermal elements have a smaller size than the central wavelength of the probe beam.

The individual nanoparticle photothermal elements preferably have volume within the range of 0.1 $nm^3$ and 1 $\mu m^3$.

If the photothermal elements are located on the interface of the substrate and the thermo-optical medium and/or located in a specific region of the thermo-optical medium, they may preferably be arranged with a surface density (i.e., the amount of photothermal elements per unit of surface area) between 0.01 $\mu m^{-2}$ and 10000 $\mu m^{-2}$, preferably between 1 $\mu m^{-2}$ and 1000 $\mu m^{-2}$. If they are dispersed in the thermo-optical medium, they may preferably be arranged with a volume density (i.e., the amount of photothermal elements per unit of volume) between 0.01 $\mu m^{-3}$ and 10000 $\mu m^{-3}$, preferably 1 $\mu m^{-3}$ and 100 $\mu m^{-3}$.

In some embodiments, the photothermal elements may be suspended or dispersed in a layer of an auxiliary material, thus forming a layer, which can be located on the interface of the substrate and the thermo-optical medium and/or located in a specific region of the thermo-optical medium. The thickness of the auxiliary layer may form a gradient. The thickness of the auxiliary material layer is up to 100 μm. Preferably, it is up to 20 μm, more preferably within the range of 1 to 100 μm or 1 to 20 μm. The photothermal elements are preferably dispersed or suspended in the auxiliary material with a volume density between 0.01 $\mu m^{-3}$ and 10000 $\mu m^{-3}$, preferably 1 $\mu m^{-3}$ and 100 $\mu m^{-3}$. The auxiliary material may preferably be selected from solid materials such as SF type glass, sapphire, epoxy, poly(methyl methacrylate) (PMMA), poly(ethyl methacrylate) (PEMA), tert-butyl poly(ether-etherketone), polydimethylsiloxane (PDMS), polyvinyl chloride (PVC), polyvinyl alcohol (PVA), polystyrene, silicone, polycarbonate and urethane acrylate elastomer; or from liquid materials such as oil, water and alcohol (e.g. glycerol, ethylene glycol, octanol, pentanol, diethylene glycol). The auxiliary material can in some embodiments be in the form of a gel or sol-gel.

In some embodiments, the photothermal elements form a continuous or discontinuous layer attached to the substrate. The layer may preferably be nanostructured and/or nanopatterned.

The maximum thickness of such layer is 10 μm, preferably 100 nm (in particular for metal layers).

The photothermal elements may be (at least partially) transparent or reflective for at least one spectral component of visible or near infrared light.

When the heating microsources are photothermal elements, then the spatial light modulator preferably additionally comprises:
- one or plurality of light sources emitting a modulating beam, which is at least one spectral component which can be absorbed by the photothermal elements,
- an optical system comprising at least one light-directing means arranged between the one or plurality of light sources and the photothermal elements.

The one or plurality of light sources of the modulating beam typically have an adjustable light power, in a range at least from 0 to 1 mW, preferably from 0 to 1 W, and/or an adjustable optical spectrum of the visible light or near-infrared light, where the range of adjustments is at least 10 nm, preferably at least 100 nm, and/or an adjustable polarization.

The light-directing means may be selected from the group comprising lenses, mirrors, apertures, beam-splitters, dichroic beam-splitters, acousto-optic modulator, an electro-optic modulator, a spinning disk, an acousto-optic deflector, a digital micromirror device, a microelectromechanical system, a galvanometric mirror system, an optical grating, or a combination of these elements.

It is advantageous when the optical system is configured so that an image plane or a back-focal plane of the optical system overlaps with the layer of heating microsource.

In some embodiments, the heating microsources may be electrothermal elements capable of being heated up by electrical current, and are in thermal contact with the layer of the thermo-optical medium, said electrothermal elements having at least one dimension smaller than 10 µm and an electrical conductivity of at least 100 S/m.

The electrothermal elements are typically made of metal (e.g., copper, iron, gold, silver, aluminium, zinc, platinum, iridium, nickel), metallic oxide (e.g. indium tin oxide, ITO), or carbon (e.g. graphite, graphene).

The electrothermal elements may be located on the substrate surface.

The electrothermal elements may form a continuous circuit.

The electrothermal elements may be configured to be heated by Joule effect or by induction heating.

The substrate may in some embodiments be selected from the group comprising glass, glass ceramic (e.g. zerodur glass), magnesium fluoride, sapphire, diamond, metal, heat conducting polymer or a combination thereof.

The substrate may be (at least partially) transparent or reflective for at least one spectral component of visible or near infrared light.

The substrate may be provided on one side of the thermo-optical medium, in thermal contact with the medium. In some embodiments, more than one substrate is used, preferably two substrates, wherein the substrates are located on opposite sides of the thermo-optical medium.

In a second aspect, the present invention provides an interferometric imaging apparatus comprising:
 a source of a probe beam, having at least one spectral component,
 a beamsplitter or a segmented mirror,
 an imaging means,
 the spatial light modulator of the present invention,
 an imaging optical system comprising at least one of lenses, mirrors, or apertures,
 a detector.

More specifically, the interferometric imaging apparatus comprises:
 a source of a probe beam having at least one spectral component positioned so that the axis of the emitted probe beam is the axis of an illumination optical path,
 a beamsplitter or a segmented mirror positioned on the axis of the illumination optical path,
 an imaging means positioned on the axis of the illumination optical path in such a way that the beamsplitter or the segmented mirror is positioned between the source of the probe beam and the imaging means,
 an imaging optical system comprising at least one of lenses, mirrors, or apertures positioned so that the axis of the imaging optical system is the axis of the imaging optical path, said imaging optical system having an image plane and/or back-focal plane,
 the spatial light modulator according to any one of the preceding claims positioned on the axis of the imaging optical path or illumination optical path,
 a detector positioned on the axis of the imaging optical path.

The source of the probe beam may preferably have at least one spectral component in the visible or near infrared region, more preferably the source of the probe beam may be a single-mode laser.

The beamsplitter may be a non-polarizing beamsplitter having a reflectivity between 10% and 90%, preferably between 30% and 70%, or a combination of a polarizing beamsplitter and a quarter waveplate allowing for higher collection efficiency of the imaging system.

The segmented mirror is a planar optical element comprising a specific pattern of at least two different surface coatings having different reflectivity, preferably at least one surface having more than 90% reflectivity and at least one surface having less than 10% reflectivity (e.g. a glass substrate with partly reflective oval area smaller than 2 mm, glass substrate with highly reflective coating uncoated in an oval area smaller than 2 mm).

The imaging means may include a microscope objective or a high-magnification lens or a solid immersion lens of numerical aperture (NA) of at least 0.1.

The detector may be selected from a point detector of light, an area detector of light, and a camera device.

In some embodiments of the interferometric imaging apparatus, the substrate, thermo-optical medium and heating microsource of the spatial light modulator may be arranged between the imaging means and the detector, wherein the image plane or the back-focal plane of the imaging optical system coincides with the position of the spatial light modulator.

In a third aspect, the present invention provides a method of spatial phase modulation of a probe beam of light, using the spatial light modulator of the present invention, said method comprising the steps of:
 emitting a probe beam along an illumination optical path,
 directing the probe beam through the spatial light modulator according to the present invention, wherein the spatial light modulator transmits at least part of the probe beam through the layer of thermo-optical medium and
 transmits at least part of the probe beam through at least one of the substrate and the heating microsource(s), or
 at least partially reflects the probe beam on at least one substrate or the heating microsource(s) and,
 causing the heating microsource(s) to heat the adjacent thermo-optical medium, resulting in a local change in the refractive index of the thermo-optical medium; and causing a local corrugation of the wavefront of the probe beam by means of said local change in the refractive index of the thermo-optical medium, in particular a rectangular profile of the temperature change causing a close-to-rectangular corrugation in the wavefront of the probe beam having the full-width-at-quarter-maximum (FWQM) of the thermo-induced phase-shift on the probe beam smaller than three times, preferably smaller than two times the width of the rectangular temperature profile.

The illumination optical path typically includes optical elements such as lenses, mirrors, apertures, or beam-splitters, or a combination thereof.

In a fourth aspect, the present invention provides a method of interferometric imaging of an object with adjustable phase of a probe beam, using the spatial light modulator and/or the interferometric imaging apparatus of the present invention, said method comprising the steps of:
 emitting a probe beam along an illumination optical path including at least one of lenses mirrors, or apertures,
 directing the probe beam through a beamsplitter or a segmented mirror and an imaging means onto the object to generate a reflected or transmitted beam, and a beam scattered by the object, collecting the reflected or transmitted beam with the imaging means, collecting the beam scattered by the object using the same imaging means, passing the collected beam scattered by the object and the collected reflected or transmitted beam through the spatial light modulator, wherein the spatial light modulator transmits at least part of the probe beam through the layer of thermo-optical medium and transmits at least part of the probe beam through at least one of the substrate and the heating microsource(s), or at least partially reflects the probe beam on at least one substrate or the heating microsource(s), and causing the heating microsource(s) to heat the adjacent thermo-optical medium, resulting in a local change in the refractive index of the thermo-optical medium; and causing a local shift of at least part of the wavefront of the reflected or the transmitted beam or the beam scattered by the object by means of said local change in the refractive index of the thermo-optical medium, and detecting the reflected or the transmitted beam and the beam scattered by the object on the detector.

Method of measurement of particle size (in particular of photothermal elements and of electrothermal elements) is transmission electron microscopy (TEM) or scanning electron microscopy (SEM) for lateral dimension and an atomic force microscope (AFM) for the thickness, and the maximum dimension mentioned herein represents a maximum dimension of any particle in a set of particles.

Method of measurement of particle volume comprises measuring of particle size and calculating the upper estimate of the volume of spherical particles, hemispheres, cubes, and stars by considering the volume of an ideal sphere of the maximum dimensions or calculating the upper estimate of the volume of nanorods, pillars, or disks from the measured dimensions considering the shape as an ideal cuboid.

BRIEF DESCRIPTION OF THE DRAWINGS

FIGS. 1a-i illustrate different configurations of the phase modulation element.

FIG. 11a-b show experimental interferometric images of gold nanospheres used to characterize the thermal lensing effect.

FIG. 12a-c presents experimental results characterizing the relative displacement of the image of three nanospheres shown on FIG. 11a-b when a π phase-shift occurs.

DETAILED DESCRIPTION AND DESCRIPTION OF PREFERRED EMBODIMENTS

The subject matter of the present invention is a spatial light modulator, more specifically a light phase modulator. The invention is based on creating a uniform temperature profile within a local spatial boundary and consequently achieving the suitable lateral distribution of temperature within the thermo-optical medium, which closely replicates the lateral distribution of its modulation in particular optical or electrical modulation. The new structure used in this invention allows to achieve close to uniform distribution of the temperature profile in the vicinity of a spatially confined heat source and minimizes the blur of the modulated patter due to a temperature gradient. In a nutshell, the principle is based on confining a thin layer of thermo-optical medium with a large refractive index sensitivity to temperature between the heating layer of heating microsources (photothermal or electrothermal elements) and a highly conductive transparent substrate. In case of photothermal elements, once a modulating beam source forms a required pattern of temperature change in the photothermal elements with structural details limited only by the light diffraction, the generated heat is driven towards the substrate of high temperature conductivity and dissipates into the environment. Similarly, a required pattern of temperature change may be produced in electrothermal elements using Joule effect or induction.

Therefore, a temperature gradient is formed across the layer of thermo-optical medium in the direction perpendicular to the layer of heating microsources, if the heating microsources form a continuous or discontinuous layer. This gradient is derived from the layer thickness of thermo-optical medium and the temperature difference between the heating microsource (e.g. photothermal element) and the substrate. Consequently, in the lateral direction the gradient between areas having different temperatures scales with the perpendicular gradient and thus can be adjusted to a sharp, close-to-step-like function by reducing the thickness of the layer of thermo-optical material and increasing the thermal conductivity of the substrate. By this means, we create an optical phase modulator for spatially resolved and fast modulation of the phase in a free-space optical system.

Figure 5:
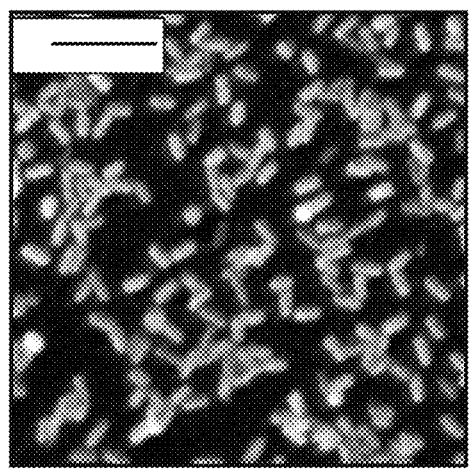
FIG. 5 shows a scanning electronic microscope (SEM) image of gold nanorods immobilized on the substrate which were used as the layer of photothermal elements (scale bar=200 nm).
Figure 6:
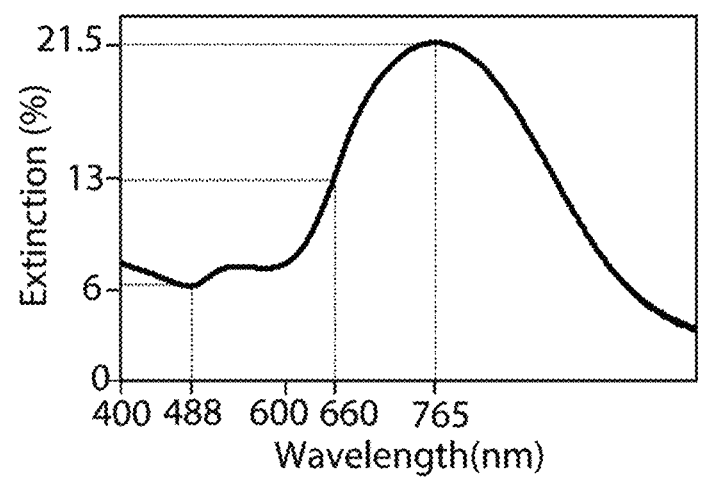
FIG. 6 shows the extinction spectrum of the gold nanorods immobilized on the substrate shown in FIG. 5.
Figure 7:
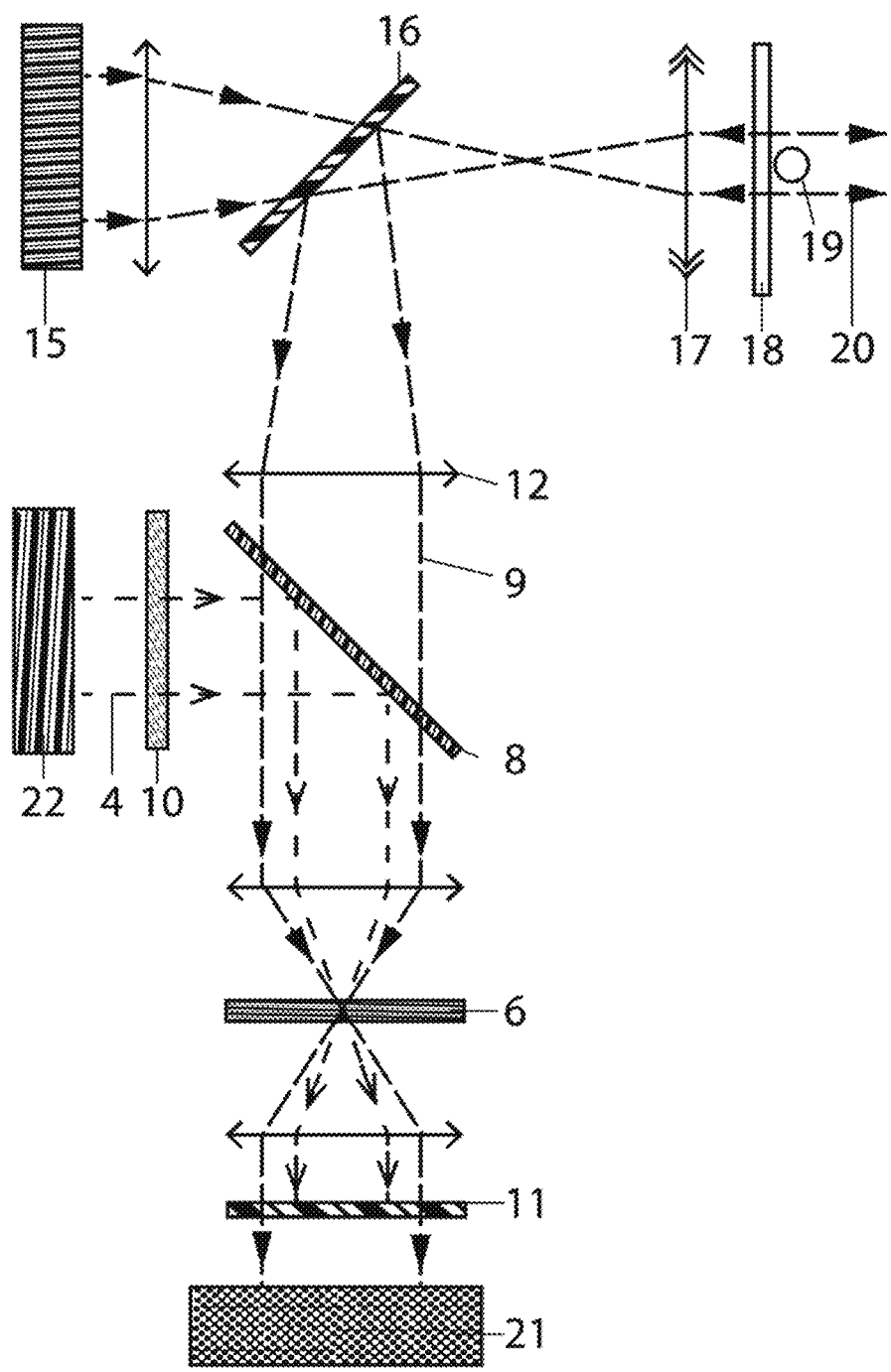
FIG. 7 depicts the layout of interferometric imaging of an object with adjustable phase of the reflected beam, using the spatial light modulator of the invention.
Figure 8A:
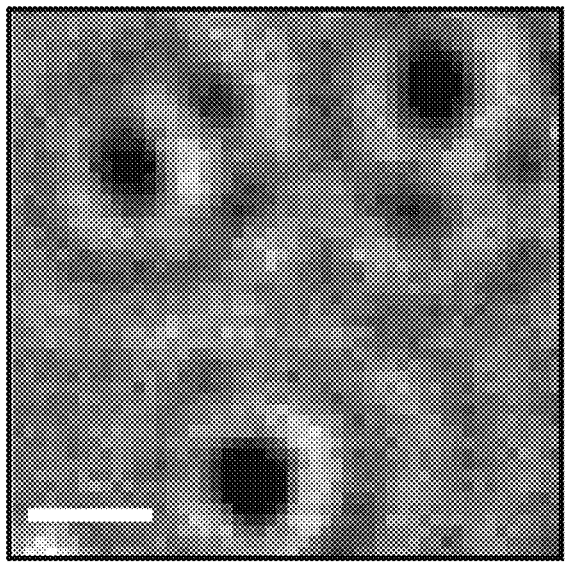
FIG. 8a-c show experimental interferometric images of gold nanospheres obtained at three different phase-shifts of the reflected beam induced using the spatial light modulator within the specific field profile (scale bar=0.5 μm).
Figure 8B:
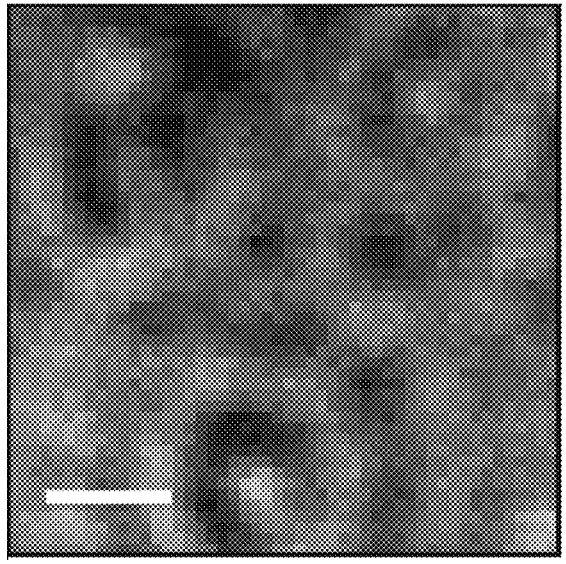
Figure 8C:
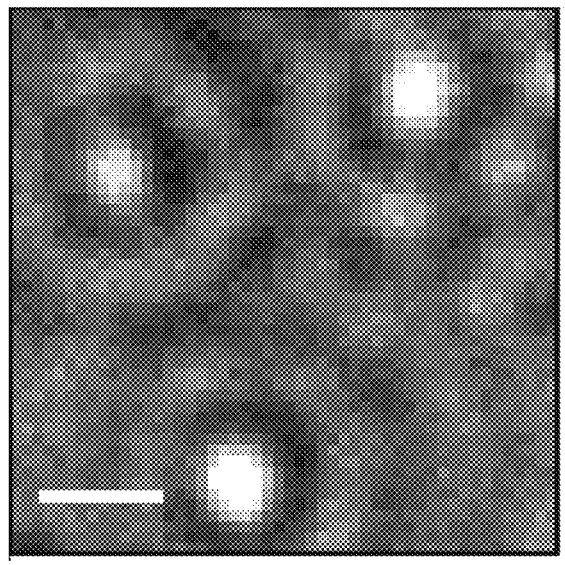
Figure 9:
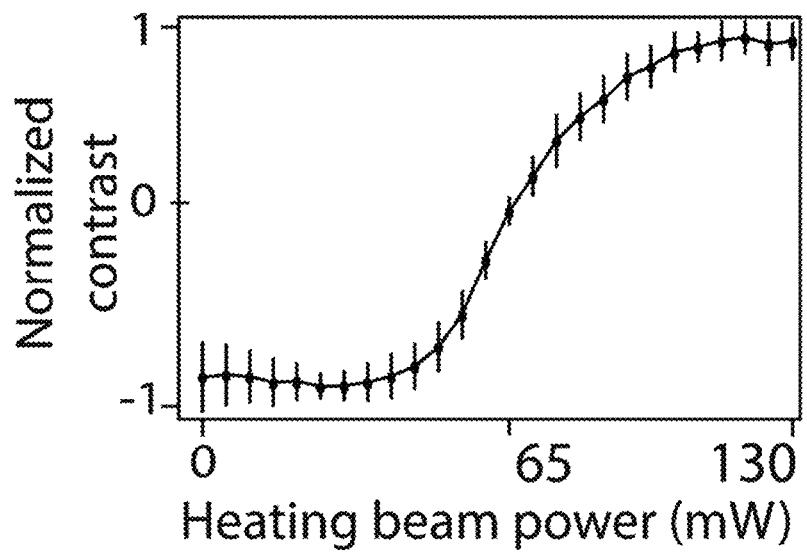
FIG. 9 presents experimental results of the interferometric contrast of a sample scatterer associated with the thermo-induced phase-shift amplitude.
Figure 10:
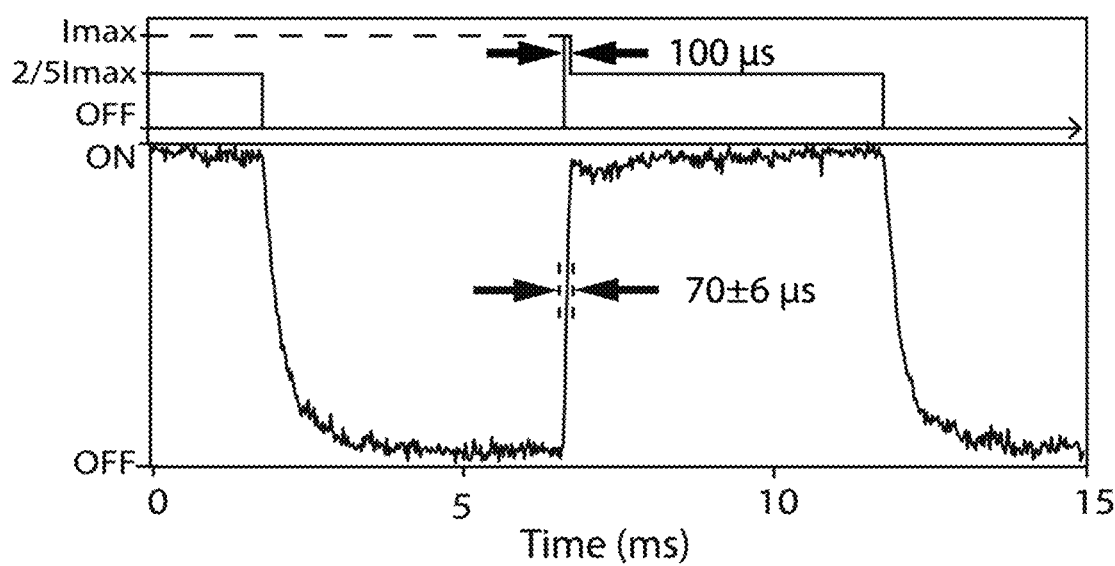
FIG. 10 presents experimental results characterizing the thermo-induced phase-shift response time. The upper diagram show the heating temporal modulation, the lower diagram, the contrast temporal variation.

We experimentally tested the effect of the thermo-optical spatial phase modulation in a configuration with a common-path homodyne interferometer shown in FIG. 7. In this experiment, also known as interferometric detection of scattering (iSCAT), a planar interface comprising scattering objects 19 (in one specific tested example, 30 nm gold nanospheres) deposited on a glass coverslip 18 was illuminated with probe beam (in particular a plane coherent wave of 488 nm wavelength) 20 forming a reflected beam from the glass coverslip and a scattered beam from the scattering object 19. The reflected beam and the scattered beam were collected with an imaging means (e.g. a microscope objective) 17 and imaged onto detector (e.g. a CMOS camera) 21 where the two beams overlapped and interfered. Along the imaging beam path the reflected beam and the scattered beam formed two optical waves sharing the same trajectory through the optical system 12, having different spatial profiles in the cross section perpendicular to the beam path. In particular, at the back-focal plane of the microscope, the reflected beam was focused to a 60-μm spot in diameter while the scattered beam propagated as a parallel wave of approximately 8 mm diameter. In one example, in order to test the spatial phase modulation device, we placed the phase modulation element 6 comprising a glass coverslip coated with gold nanorods of 20 nm×50 nm (diameter×length) at the density of 300 μm$^{-1}$ and random orientation (scanning electronic microscope image on FIG. 5 and the corresponding extinction spectrum on FIG. 6), a layer of <20 μm of glycerol and a polished sapphire substrate of 3 mm thickness into the back-focal plane of the imaging beam path perpendicular to the direction of beam propagation. At the position of the phase modulation element 6 the reflected beam and the scattered beam together form the probe beam 9 of the spatial light modulator. We illuminated an area of 60 μm in diameter coinciding with the position of the reflected beam with the modulating beam 4, from a light source 22 of 660 nm wavelength via a dichroic mirror 8. By modulating the power of the modulating beam 4 with an acousto-optic modulator 10 in a range between 0 and 130 mW, we observed a strong contrast change in the interferometric signal on the CMOS camera with minor or none influence on the intensity profile of the image of the reflected beam (illustrated FIG. 8a-c). In the generally described configuration, the contrast of interferometric signal is expressed as:

$$C = \frac{2s\cos(\Delta\varphi + \varphi_{SLM})}{r}$$

where r is the amplitude reflectivity of the glass coverslip, s the scattering amplitude, Δφ the phase difference between the scattered and the reflected beam and $\varphi_{SLM}$ the phase-shift induced by the spatial light modulator on the reflected beam. By sketching the mean contrast variation of different nanoparticles interference image, we could observe a sinusoidal change of contrast (FIG. 9). In addition, when using the heating modulation described in the upper timing diagram in FIG. 10, we could reach a response time of 70 μs (lower diagram FIG. 10). By comparing the absolute change in the localized positions of the imaged nanoparticles (FIG. 11a-b) we found that shifting the phase of the reflected beam by π distorts the image by less than 10 nm in all directions (FIG. 12a-c). When relating the position change to the particle-particle distance within the field of view, we conclude that distortion of the image carried by the scattered beam is less than 0.5%. Therefore, we consider the thermal lens effect as negligible.

Figure 13:
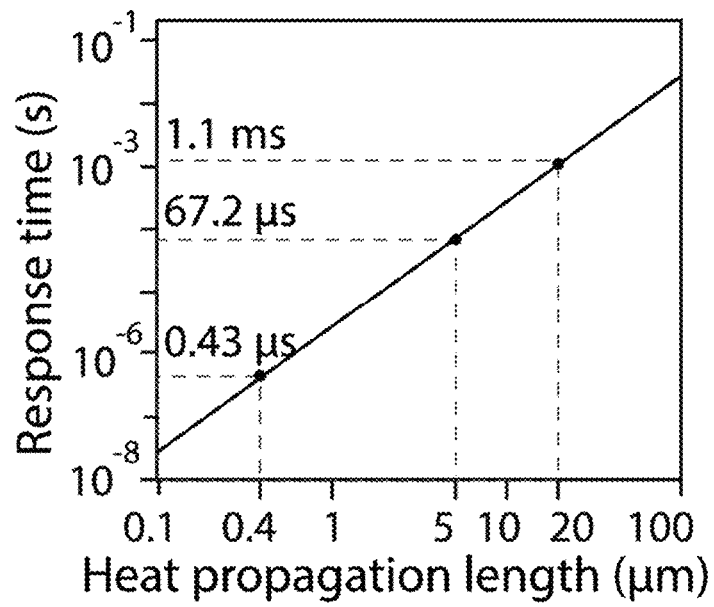
FIG. 13 presents results of numerical simulations of the response time dependence on the heat propagation length (preferably corresponding to the thermo-optical medium thickness) when considering glycerol as the thermo-optical medium. The xy axes are in logarithmic scale.

The characteristic response time τ of a thermal process to reach a steady state can be estimated from the heat equation and is expressed as:

$$\tau = \frac{L^2 \rho c_p}{4\kappa},$$

wherein L is the characteristic size of the system, e.g. the thickness or the heated area diameter depending on which parameters limits the heat propagation, ρ the density, $c_p$ the thermal capacity and κ the thermal conductivity of the thermo-optical medium. This equation shows that the response time can be further reduced by scaling the geometry of the structure down with a theoretical limit in the nanosecond range, which is limited by the diffraction limit of optical imaging as shown in FIG. 13.

The theoretical model of the thermally generated phase-shift is based on solving the heat equation. If we consider a point heat source delivering a power Q in a homogeneous liquid medium, the temperature distribution T(r) in steady state is governed by the following equation:

$$T(r) = \frac{Q}{4\pi\kappa|r|} + T_\infty$$

$$T(r) = QG(r) + T_\infty$$

with κ the thermal conductivity of the medium (W·K$^{-1}$·m$^{-1}$), r a 3D vector representing the vector distance from the heat source (m), $T_\infty$ is the reservoir temperature i.e. the room temperature, and G(r)=1/(4πκ|r|) stands for the Green's function of the heat equation. The system used in the proof of concept experiment comprised a three-layer structure: 20 μm thick liquid glycerol sandwiched between a glass coverslip and a sapphire window, both having a thickness of 140 μm, and the layer of heating microsources at the glass/glycerol interface. In this case, the Green's function has a more complex form depending on the thermal conductivity of the three layer and their respective thicknesses and in our simulations we use previously derived form from the reference Eng Anal Bound Elem. 1999; 23(9):777-786.

When taking into account a 2D heat source, we consider Q as a two dimensional function. The temperature is calculated from a convolution product of Q(ρ) and G(ρ, z):

$$T(\rho,z)=Q(\rho)\otimes G(\rho,z)+T_\infty.$$

Q(ρ) represents a heat source density (W/m$^2$). ρ and z are the cylindrical coordinates of the system, in particular ρ the coordinate parallel to the heat source and z the axial coordinate. In the simulation there are photothermal elements considered as the heating microsources receiving a modulating beam of a power P (W), focused on a surface S (m$^2$) of the heating microsources, in particular gold nanorods homogeneously distributed on a glass layer, with an absorption cross section $\sigma_{abs}$ (m$^2$). The total delivered heating power Q is:

$$Q = \sigma_{abs}\frac{P}{S}.$$

Figure 14:
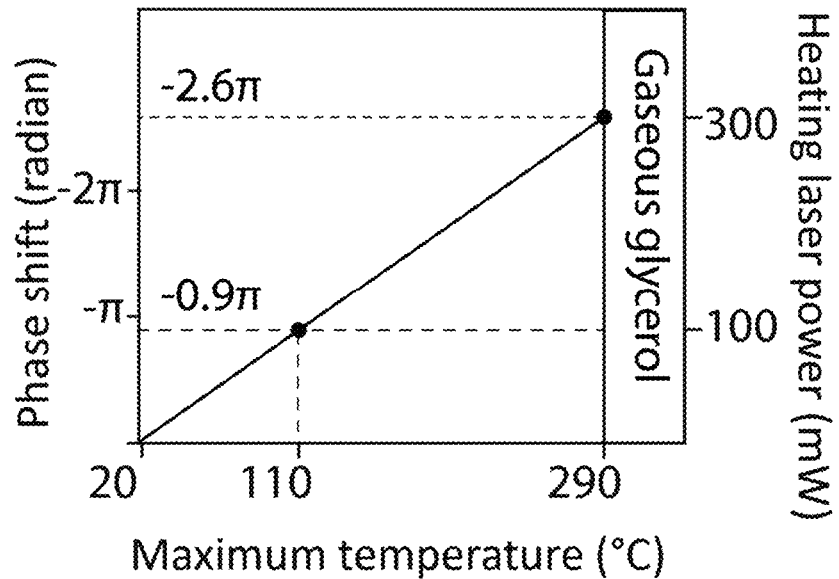
FIG. 14 presents results of numerical simulations of the modelled phase-shift for different heating power corresponding to different maximum temperatures. The considered system comprise a 60-μm heat source in diameter, 20-μm thick glycerol layers as the thermo-optical medium sandwiched between a glass coverslip and a sapphire window.
Figure 15:
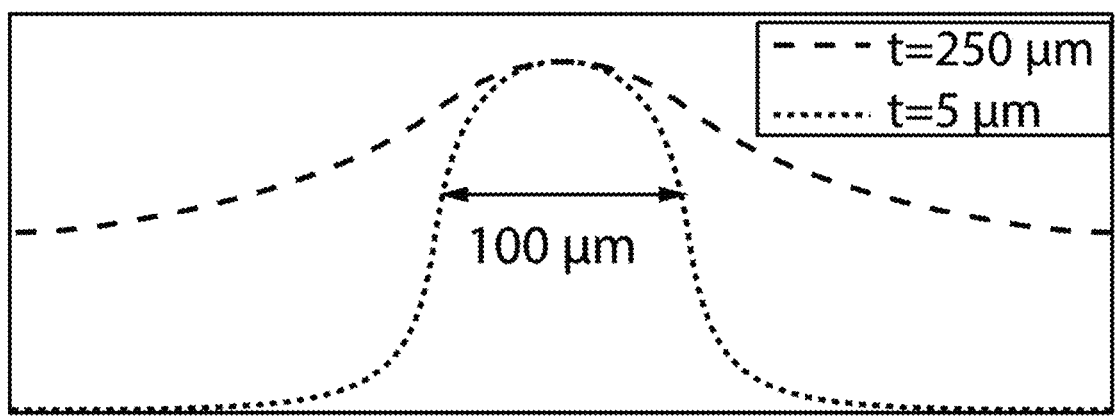
FIG. 15 presents results of numerical simulations of the phase-shift profile for a disk heat source of 100 μm diameter, glycerol thermo-optical medium of a thickness of 250 μm and 5 μm, respectively. The thermo-optical medium was sandwiched between a glass coverslip and a sapphire window.

The relation between the refractive index distribution $\Delta n_i(\rho, z) = n_i(T(\rho, z)) - n_i(T_\infty)$ and the temperature $T(\rho, z)$ can be approximate for small temperature change by the first order of a Taylor series of the refractive index variation, commonly referred to as thermo-optic coefficient dn/dT. If we consider the modulating beam of a wavelength $\lambda$, propagating in the direction of the z axis through the heated layers, the thermo-induced phase-shift $\varphi_{therm}$ yields:

$$\varphi_{therm} = \frac{2\pi}{\lambda}\left(\int_{-\Delta_1}^{0}\Delta n_1(\rho, z)dz + \int_{0}^{\Delta_2}\Delta n_2(\rho, z)dz + \int_{\Delta_2}^{\Delta_3}\Delta n_3(\rho, z)dz\right),$$

where $\Delta_1$ and $\Delta_3$ is the thickness of the two substrates and $\Delta_2$ is the thickness of the thermo-optical medium, $\Delta n_1$ and $\Delta n_3$ are the refractive index variations of the lower and upper substrate respectively and $\Delta n_2$ is the refractive index variation of the thermo-optical medium. FIG. 14 illustrates the resulting phase-shift dependence on the temperature change associated with the heating power used in the model. The maximum phase-shift is this particular system limited by the boiling temperature of glycerol (290° C.). This limit is equivalent to a phase-shift magnitude of $2.6\pi$ for a 60-µm disk heat source, with a wavelength of the probe beam of 488 nm, and a glycerol layer of 20-µm thickness sandwiched between a glass and a sapphire substrate. FIG. 15 plots the phase-shift profile of the probe beam 9 for the thermo-optical medium (glycerol) of the thickness of 250 µm and 5 µm in long dash line and short dash line, respectively. The phase-shift profile for the 250 µm thick layer clearly shows a slow gradient of the phase-shift extending hundreds of µm far from the heated area of the structure. The combined effect of reducing the thickness of the layer of thermo-optical medium and closing the gap to the high thermal conductivity of the adjacent substrate results in reshaping of the gradient profile into sharp step-like profile (short dashed line).

Several possible embodiments of the invention and experimental approaches are described in FIGS. 1-4 and 7. FIG. 1 describes different embodiments of the phase modulation element 6 and FIGS. 2-4 and 7 different embodiments with the phase modulation device included in different optical system configurations.

In one embodiment, sketched in FIG. 1.a and FIG. 1.b, photothermal elements 3, which in one example are gold nanorods of 20 nm×50 nm (diameter×length) at the density of 300 µm$^{-1}$ and random orientation (described on FIGS. 5 and 6), are immobilized on the substrate 1 (in specific embodiments, e.g., the substrate is glass, sapphire, or diamond). A thermo-optical medium 2, in this specific example liquid glycerol, is placed on top of the layer of nanorods and is sandwiched with another substrate 1. A light beam called modulating beam 4 featuring a central wavelength close to the plasmon resonance of the gold nanorods illuminates the photothermal elements 3 from either side shown in FIG. 1.a and FIG. 1.b, respectively.

In the second the embodiment (FIG. 1.c), the photothermal elements 3 is sandwiched between two layers of thermo-optical media 2 which are surrounded by two substrates 1 with higher thermal conductivity than the thermo-optical media. In this configuration, the photothermal elements 2 can be confined between two layers of solid, glass or polymer layers of thermo-optical medium. Examples of thermo-optical media 2 include glasses with high refractive index sensitivity to temperature such as P-SF68 glass (dn/dT=24.1×10$^{-6}$ K$^{-1}$) or polymers such as PDMS (dn/dT≈−4.5×10$^{-4}$ K$^{-1}$). Thus, the thermo-optic variation in the refractive index occurs on both sides of the heating microsources and heat dissipation takes place symmetrically to both substrates.

In the third embodiment (FIG. 1.d), there is a reflective surface 5 for the modulating beam below the heating microsources (e.g. photothermal elements). Consequently, the modulating beam 4 is absorbed twice by the heating microsources 3 increasing the modulation efficiency.

The fourth embodiment (FIG. 1.e) combines the principle of embodiments described in FIGS. 1.c and 1.d. The heating microsources (e.g. photothermal elements) 3 are sandwiched between two layers of thermo-optical media 2. Adjacent to one layer of the thermo-optical medium, there is a reflective surface 5.

The fifth embodiment (FIG. 1.f) is similar to embodiment FIG 1.e with additional transparent substrate 2 located between the heating microsources (e.g. photothermal elements) and the reflective surface 5 to improve the shaping of the thermo-induce refractive index variation profile.

In the sixth embodiment (FIG. 1.g), the top and bottom layers 2 are semitransparent mirrors designed to form a Fabry-Perrot resonator generating multiple reflections in the phase modulation element 6, which maximizes the photothermal elements 3 absorption efficiency and feature additional cavity detuning effects resulting in an amplitude modulation option of the spatial light modulation system.

The seventh embodiment (FIG. 1.h) illustrates the case where the heating microsources (e.g. photothermal elements) are suspended or dispersed in a layer of an auxiliary material (e.g. PDMS or glycerol) forming a layer 7 sandwiched between two substrates 1. The layer 7 adopts the function of thermo-optic medium and comprise the heating microsources at the same time.

The eighth embodiment (FIG. 1.i) is similar to embodiment FIG. 1.h. The heating microsources (e.g. photothermal elements) are suspended or dispersed in a layer of an auxiliary material (e.g. PDMS) and forming a layer 7 sandwiched between two substrates 1. The thickness of the layer 7 have a linear gradient allowing to generate linear phase gradient with additional phase modulation.

Figure 2:
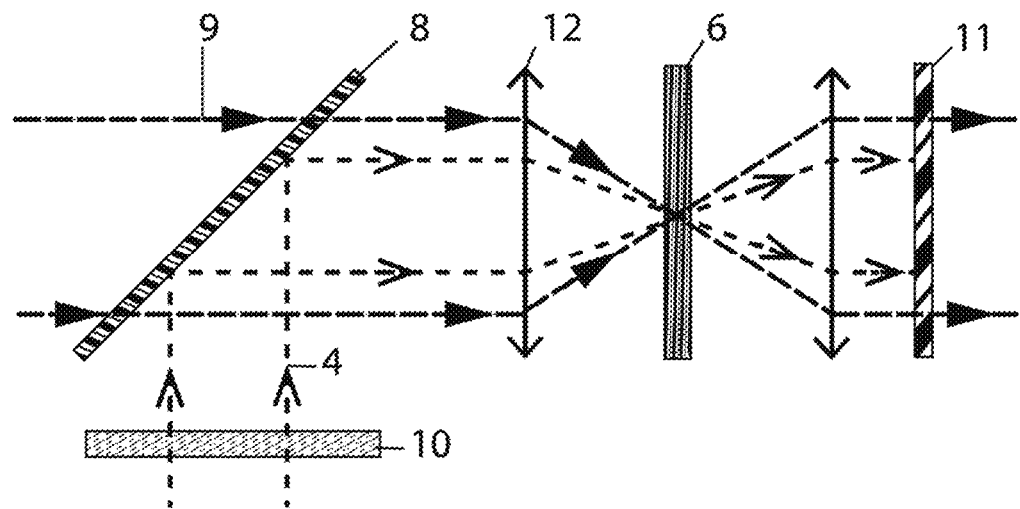
FIG. 2 depicts the embodiment of the spatial light modulator in configuration with spatial overlap of the modulating beam and the probe beam at the common focus.
Figure 3:
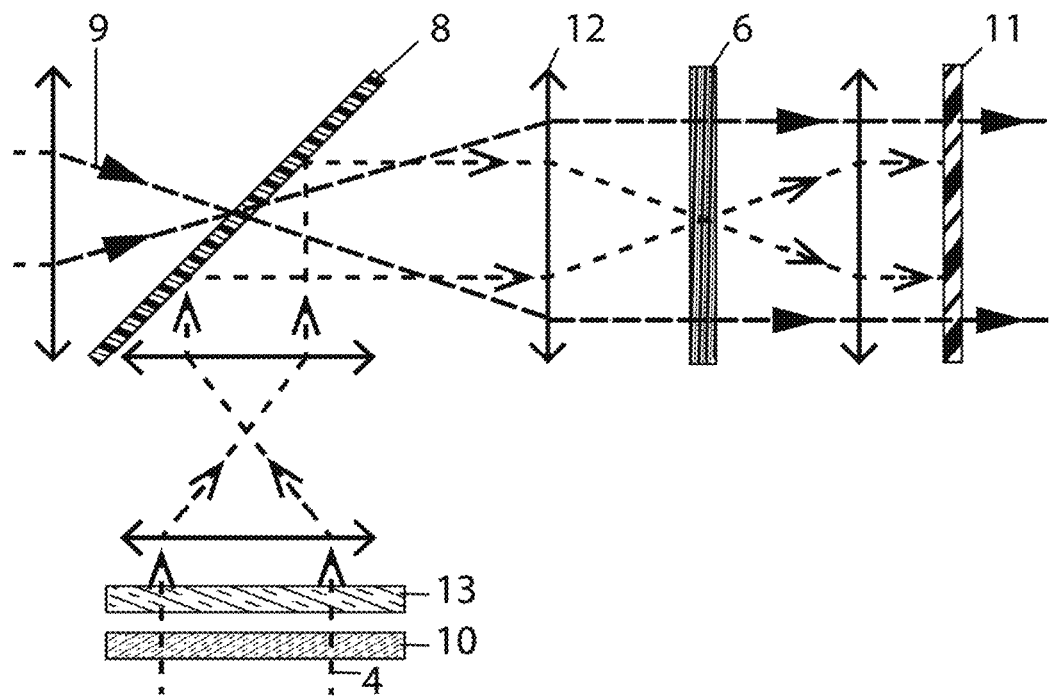
FIG. 3 depicts the embodiment of the spatial light modulator with a focused modulating beam acousto-optically scanned across the area of the probe beam to encode a spatially resolved pattern of phase modulation.
Figure 4:
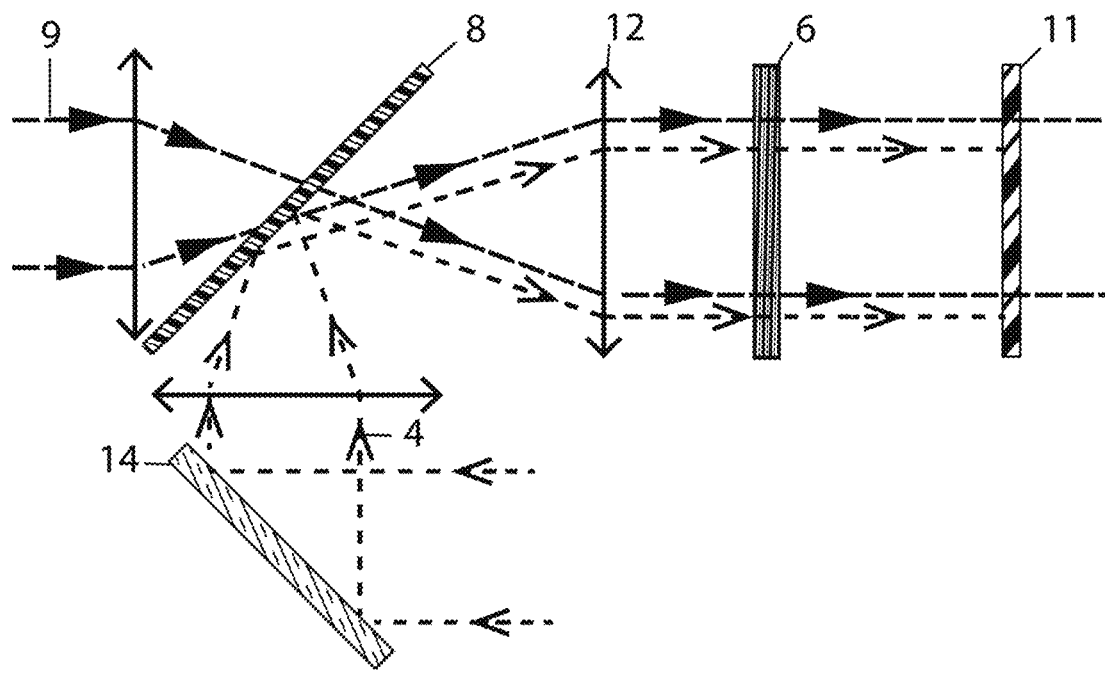
FIG. 4 depicts the embodiment of the spatial light modulator with spatially patterned wavefront of the modulating beam by means of a digital micromirror device.

The ninth embodiment depicted in FIG. 2 uses one of the phase modulation elements in FIG. 1.a, b, c or h to induce a homogeneous phase-shift within a restricted diameter of a light beam referred to as the probe beam 9. The probe beam 9 and modulating beam 4 of different central wavelengths are combined using a dichroic mirror 8 selected based on their optical spectrum. They are both focused on the same position with an afocal system made of optical lenses 12. An optical filter 11 then filters the modulating beam. The probe beam 9 and modulating beam 4 can be co-propagating or counter-propagating without any effect on the system performance (co-propagating version is depicted). The phase modulation element 6 is placed at the focal plane of the probe beam 9 and the modulating beam 4 orthogonally to the probe beam optical axis. The modulating beam 4 homogenously illumines a segment of the phase modulation element 6 and generates a variation in the refractive index of the thermo-optical medium via a photothermal effect in the layer of photothermal elements. As the probe beam 9 passes through the same segment of the phase modulation element 6 with altered refractive index, the probe beam undergoes a phase-shift derived from the refractive index change and the thickness of the layer of thermo-optical medium. The power of the modulating beam 4 is controlled via an acousto-optic modulator 10 influencing the magnitude of the phase-shift.

The tenth embodiment (FIG. 3) uses one of the phase modulation elements in FIG. 1.*a, b, c* or *h* to induce spatially patterned phase-shift on the probe beam 9. It is designed to spatially control the lateral distribution of the phase-shift of the probe beam 9. The optical system 12 is used to focus the modulating beam 4 on the phase modulation element 6 whilst the probe beam is collimated. An acousto-optic deflector 13, placed at the back-focal plane of the optical system 12, is used to scan the focus position of the modulating beam on the phase modulation element 6. To achieve a stable distribution of the phase-shift of the probe beam, the scanning of the modulating beam 4 position needs to be fast enough comparing to the response time of the phase-shift change. Considering a typical response time of the phase modulation element ranging from 1 µs to 100 µs, acousto-optic deflector running at MHz to GHz frequencies is required to fulfill the refresh-rate requirement. During scanning, the acousto-optic modulator 10 allows one to temporally modulate the power of the modulating beam and thus to generate 2D phase-shift pattern on the probe beam.

The eleventh embodiment (FIG. 4) uses one of the phase modulation elements in FIG. 1.*a, b, c* or *h* to induce spatially patterned phase-shift on the probe beam 9. It is designed to spatially control the lateral distribution of the phase-shift of the probe beam 9. Here probe beam 9 and modulating beam 4 are both collimated at the phase modulation element 6. A digital micromirror device 13 is used to pattern the intensity profile of the modulating beam 4 and the intensity variation of the modulating beam 4 is imaged on the phase modulation element 6.

The twelfth embodiment is an interferometric microscope shown in FIG. 7. It uses one of the phase modulation elements in FIG. 1.*a, b, c* or *h*. A planar interface comprising scattering objects 19 deposited on a glass coverslip 18 is illuminated with plane coherent wave 20 radiated from a light source 15, preferably a single-mode laser, and form a reflected beam from the glass coverslip and a scattered beam from the scattering object 19. The reflected beam and the scattered beam are collected with an imaging means 17 (preferably, a microscope objective) and imaged on a detector (e.g. a CMOS camera) 21 where the two beams overlap and interfere. Along the imaging beam path the reflected beam and the scattered beam form two optical waves sharing the same trajectory via a beam splitter 16 and the optical system 12, having different spatial profiles in the cross section perpendicular to the beam path. In particular, at the back-focal plane of the microscope, the reflected beam is focused to a diffraction-limited spot while the scattered beam propagates as a parallel wave. The phase modulation element 6 is placed at the back-focal plane of the imaging beam path perpendicular to the direction of light propagation. At the position of the phase modulation element 6, the reflected beam and the scattered beam together form the probe beam 9 of the spatial light modulator. The modulating beam 4 is generated by a light source 22. The probe beam 9 and modulating beam 4 of different central wavelengths are combined using a dichroic mirror 8 selected based on their optical spectrum. They are both focused on the same position with an afocal system made of optical lenses 12. An optical filter 11 then filters the modulating beam. The probe beam 9 and the modulating beam 4 can be co-propagating or counter-propagating without any effect on the system performance (co-propagating version is depicted). The modulating beam 4 illumines a segment of the phase modulation element 6 and generates a variation in the refractive index of the thermo-optical medium via a photothermal effect in the layer of photothermal elements. As the probe beam 9 passes through the phase modulation element 6 the reflected beam passes through the segment of the phase modulation element 6 with altered refractive index. The part of the probe beam corresponding to the reflected beam undergoes a phase-shift derived from the refractive index change and the thickness of the layer of the thermo-optical medium. The power of the modulating beam 4 is controlled via an acousto-optic modulator 10 to adjust the magnitude of the thermo-induced phase-shift. The embodiments described herein with reference to photothermal elements, can be reproduced with electrothermal elements, using Joule effect or induction instead of modulating beam.

INDUSTRIAL APPLICABILITY

The present invention offers a wide range of industrial applications, especially in advanced technology and modern imaging methods. Examples of utility include scientific instruments, such as super-resolution microscopes, holographic microscopes and interference microscopes. The invention may further be used in adaptive optics where it complements the portfolio of available active components for light wave modulation, the invention being superior in particular in modulation rate and resolution. Last but not least, the invention may be used in methods of quantitative phase imaging and 3D image processing, as it offers the possibility of very fast scanning of phase information (thus, three-dimensional information) about the observed object.

Generally, the invention is applicable in a wide range of nanosciences and biosciences, in particular for the characterization of materials and biological substances. In a specific example, the invention can be used in a 3D cell tomography apparatus for medical diagnostics or mass photometry for detection of the mass of single biomolecular species.

The invention claimed is:

1. A spatial light modulator, said spatial light modulator comprising:
    a layer of thermo-optical medium, wherein the thermo-optical medium is at least partially transparent for at least one spectral component of visible or near infrared light and having the thermal conductivity between 0.01 and 30 W K$^{-1}$ m$^{-1}$ at the temperature of 20° C., said layer having a thickness up to 100 µm,
    at least one heating microsource in thermal contact with the layer of the thermo-optical medium, wherein each heating microsource has at least one dimension smaller than 10 µm;
    at least one substrate in thermal contact with the thermo-optical medium, said substrate having a thermo-optic coefficient at least 10 times smaller than a thermo-optic coefficient of the thermo-optical medium and a thermal conductivity of at least 1 W K$^{-1}$ m$^{-1}$ while the thermal conductivity of the substrate is higher than the thermal conductivity of the thermo-optical medium;
    wherein the heating microsources are photothermal elements which are in thermal contact with the layer of the thermo-optical medium, said photothermal elements having at least one dimension smaller than 10 µm; and
    wherein each nanoparticle photothermal element has a volume within the range of 0.1 nm$^3$ to 1 µm$^3$.

2. The spatial light modulator according to claim 1, wherein the thickness of the layer of the thermo-optical medium is up to 100 µm.

3. The spatial light modulator according to claim 1, wherein the thickness of the layer of the thermo-optical medium is within the range of 1 to 20 µm.

4. The spatial light modulator according to claim 1, wherein the thermo-optical medium has a thermo-optic coefficient equal to or higher than $8 \times 10^{-5}$ K$^{-1}$ at 20° C. and for visible light.

5. The spatial light modulator according to claim 1, wherein the photothermal elements are located on the interface of the substrate and the thermo-optical medium and/or dispersed in the thermo-optical medium and/or located in a predetermined region of the thermo-optical medium.

6. The spatial light modulator according to claim 1, wherein the photothermal elements are shaped substantially as spheres, hemispheres, rods, cubes, stars, pillars, disks, or a mixture of such elements, or the photothermal elements are in the form of colloidal particles; and wherein the largest dimension of the colloidal particles is up to 1 µm, preferably smaller than 100 nm.

7. The spatial light modulator according to claim 1, wherein the photothermal elements are suspended or dispersed in a layer of an auxiliary material, thus forming a layer located on the interface of the substrate and the thermo-optical medium and/or located in a predetermined region of the thermo-optical medium, and wherein the auxiliary material is preferably selected from solid materials such as SF type glass, sapphire, epoxy, poly(methyl methacrylate), poly(ethyl methacrylate), tert-butyl poly(etheretherketone), polydimethylsiloxane, polyvinyl chloride, polyvinyl alcohol, polystyrene, silicone, polycarbonate and urethane acrylate elastomer; or from liquid materials such as oil, water, glycerol, ethylene glycol, diethylene glycol, octanol, dodecanol.

8. The spatial light modulator according to claim 1, wherein the photothermal elements form a continuous or discontinuous layer attached to the substrate, the said layer preferably being nanostructured and/or nanopatterned, wherein the maximum thickness of such layer is 10 µm, preferably 100 nm.

9. The spatial light modulator according to claim 1, wherein two substrates are provided, wherein the substrates are located on opposite sides of the thermo-optical medium.

10. An interferometric imaging apparatus comprising:
a source of a probe beam having at least one spectral component positioned so that the axis of the emitted probe beam corresponds to an axis of an illumination optical path,
a beamsplitter or a segmented mirror positioned on the axis of the illumination optical path,
an imaging means positioned on the axis of the illumination optical path in such a way that the beamsplitter or the segmented mirror is positioned between the source of the probe beam and the imaging means,
an imaging optical system comprising at least one of lenses, mirrors, or apertures positioned so that the axis of the imaging optical system is the axis of the imaging optical path, said imaging optical system having an image plane and/or back-focal plane,
a spatial light modulator comprising:
a layer of thermo-optical medium, wherein the thermo-optical medium is at least partially transparent for at least one spectral component of visible or near infrared light and having the thermal conductivity between 0.01 and 30 W K$^{-1}$ m$^{-1}$ at the temperature of 20° C., said layer having a thickness up to 100 µm,
at least one heating microsource in thermal contact with the layer of the thermo-optical medium, wherein each heating microsource has at least one dimension smaller than 10 µm,
at least one substrate in thermal contact with the thermo-optical medium, said substrate having a thermo-optic coefficient at least 10 times smaller than a thermo-optic coefficient of the thermo-optical medium and a thermal conductivity of at least 1 W K–1 m–1 while the thermal conductivity of the substrate is higher than the thermal conductivity of the thermo-optical medium, and
wherein the spatial light modulator is positioned on the axis of the imaging optical path or illumination optical path, and
a detector positioned on the axis of the imaging optical path.

11. The interferometric imaging apparatus according to claim 10, wherein the substrate, the thermo-optical medium and the heating microsource(s) of the spatial light modulator are arranged between the imaging means and the detector, wherein the image plane or the back-focal plane of the imaging optical system coincides with the position of the spatial light modulator.

12. A method of spatial phase modulation of a probe beam of light, using a spatial light modulator comprising:
a layer of thermo-optical medium, wherein the thermo-optical medium is at least partially transparent for at least one spectral component of visible or near infrared light and having the thermal conductivity between 0.01 and 30 W K–1 m–1 at the temperature of 20° C., said layer having a thickness up to 100 µm,
at least one heating microsource in thermal contact with the layer of the thermo-optical medium, wherein each heating microsource has at least one dimension smaller than 10 µm;
at least one substrate in thermal contact with the thermo-optical medium, said substrate having a thermo-optic coefficient at least 10 times smaller than a thermo-optic coefficient of the thermo-optical medium and a thermal conductivity of at least 1 W K–1 m–1 while the thermal conductivity of the substrate is higher than the thermal conductivity of the thermo-optical medium,
said method comprising the steps of:
emitting a probe beam along an illumination optical path,
directing the probe beam through the spatial light modulator, wherein the spatial light modulator transmits at least part of the probe beam through the layer of thermo-optical medium and
transmits at least part of the probe beam through at least one of the substrate and the heating microsource(s), or
at least partially reflects the probe beam on at least one substrate or the heating microsource(s), and
causing the heating microsource(s) to heat the adjacent thermo-optical medium, resulting in a local change in the refractive index of the thermo-optical medium; and
causing a local shift of the wavefront of the probe beam by means of said local change in the refractive index of the thermo-optical medium.

13. A method of interferometric imaging of an object with adjustable phase of a probe beam, using a spatial light modulator comprising:
a layer of thermo-optical medium, wherein the thermo-optical medium is at least partially transparent for at least one spectral component of visible or near infrared light and having the thermal conductivity between 0.01 and 30 W K−1 m−1 at the temperature of 20° C., said layer having a thickness up to 100 μm, at least one heating microsource in thermal contact with the layer of the thermo-optical medium, wherein each heating microsource has at least one dimension smaller than 10 μm;

at least one substrate in thermal contact with the thermo-optical medium, said substrate having a thermo-optic coefficient at least 10 times smaller than a thermo-optic coefficient of the thermo-optical medium and a thermal conductivity of at least 1 W K−1 m−1 while the thermal conductivity of the substrate is higher than the thermal conductivity of the thermo-optical medium, wherein said method comprising the steps of:

emitting a probe beam along an illumination optical path including at least one of lenses mirrors, or apertures, directing the probe beam through the beamsplitter or the segmented mirror and the imaging means onto the object to generate a reflected or transmitted beam and a beam scattered by the object, collecting the reflected or transmitted beam with the imaging means, collecting the beam scattered by the object using the same imaging means, passing the collected beam scattered by the object and the collected reflected or transmitted beam through the spatial light modulator, wherein the spatial light modulator transmits at least part of the probe beam through the layer of thermo-optical medium and transmits at least part of the probe beam through at least one of the substrate and the heating microsource(s), or at least partially reflects the probe beam on at least one substrate or the heating microsource(s), and causing the heating microsource(s) to heat the adjacent thermo-optical medium, resulting in a local change in the refractive index of the thermo-optical medium; and causing a local shift of at least part of the wavefront of the reflected or the transmitted beam or the beam scattered by the object by means of said local change in the refractive index of the thermo-optical medium, and detecting the reflected or the transmitted beam and the beam scattered by the object on the detector.

* * * * *